United States Patent
Kawasaki et al.

(10) Patent No.: US 12,480,946 B2
(45) Date of Patent: Nov. 25, 2025

(54) METHOD AND KIT FOR RAPID MEASUREMENT OF AUTOANTIBODY ACTIVITY WITH RESPECT TO TSH RECEPTOR

(71) Applicants: Yamasa Corporation, Chiba (JP); Tohoku University, Miyagi (JP)

(72) Inventors: Atsushi Kawasaki, Chiba (JP); Motoki Hoshina, Chiba (JP); Junken Aoki, Miyagi (JP); Kouki Kawakami, Miyagi (JP); Asuka Inoue, Miyagi (JP)

(73) Assignees: YAMASA CORPORATION, Chiba (JP); TOHOKU UNIVERSITY, Miyagi (JP)

( * ) Notice: Subject to any disclaimer, the term of this patent is extended or adjusted under 35 U.S.C. 154(b) by 1304 days.

(21) Appl. No.: 17/272,752

(22) PCT Filed: Sep. 2, 2019

(86) PCT No.: PCT/JP2019/034400
§ 371 (c)(1),
(2) Date: Mar. 2, 2021

(87) PCT Pub. No.: WO2020/050208
PCT Pub. Date: Mar. 12, 2020

(65) Prior Publication Data
US 2021/0318305 A1    Oct. 14, 2021

(30) Foreign Application Priority Data

Sep. 5, 2018   (JP) ................................ 2018-165733
Feb. 7, 2019   (JP) ................................ 2019-020595

(51) Int. Cl.
G01N 33/68    (2006.01)
G01N 33/564   (2006.01)

(52) U.S. Cl.
CPC ..... *G01N 33/564* (2013.01); *G01N 2333/726* (2013.01)

(58) Field of Classification Search
None
See application file for complete search history.

(56) References Cited

U.S. PATENT DOCUMENTS

| 9,567,578 | B1 * | 2/2017 | Lee | ........................ | C12N 5/0686 |
| 2009/0325177 | A1 * | 12/2009 | Kohn | ........................ | C07K 14/72 |
| | | | | | 435/6.18 |
| 2013/0065252 | A1 | 3/2013 | Li et al. | | |

FOREIGN PATENT DOCUMENTS

| GB | 2450430 A1 * | 5/2012 | .............. C12N 5/00 |
| JP | 2004500580 A | 1/2004 | |
| JP | 2007537707 A | 12/2007 | |
| JP | 2010539975 A | 12/2010 | |
| JP | WO2012086756 A1 | 6/2012 | |
| JP | 2014117168 A | 6/2014 | |
| JP | 2015-000021 A | 1/2015 | |
| JP | 2016032472 A | 3/2016 | |
| JP | 2016075707 A | 5/2016 | |
| JP | WO2016035677 A1 | 6/2017 | |
| JP | 2017192396 A | 10/2017 | |
| WO | 99/16902 A1 | 4/1999 | |
| WO | 2009142735 A2 | 11/2009 | |
| WO | WO2011001885 A1 | 1/2011 | |
| WO | 2015128894 A1 | 9/2015 | |
| WO | 2020/185926 A1 | 9/2020 | |

OTHER PUBLICATIONS

Robinson et al., Development of a High-Throughput Screening-Compatible Cell-Based Functional Assay to Identify Small Molecule Probes of the Galanin 3 Receptor, Assay and Drug Development Technologies, vol. 11, No. 8, 2013, pp. 1-17. (Year: 2013).*
Scott et al., An evaluation of Minor Groove Binders as anti-Trypanosoma bruccei bruccei therapeutics, European Journal of Medicinal Chemistry, 116, 2016, pp. 116-125. (Year: 2016).*
Boutin, Alisa et al. "Multiple Transduction Pathways Mediate Thyrotropin Receptor Signaling in Preosteoblast-Like Cells" Endocrinology, vol. 157, Issue 5, May 1, 2016.
Makita, Noriko et al. "An acquired hypocalciuric hypercalcemia autoantibody induces allosteric transition among active human Ca-sensing receptor conformations" Proc Natl Acad Sci USA 104: 5443-8, 2007.
Cesidio, Giuliani et al. "A TSHR-LH/CGR Chimera that Measures Functional Thyroid-Stimulating Autoantibodies (TSAb) Can Predict Remission or Recurrence in Graves' Patients Undergoing Antithyroid Drug (ATD) Treatment", Journal of Clinical Endocrinology and Metabolism, vol. 97, No. 7, Jul. 1, 2012 (Jul. 1, 2012), pp. E1080-E1087.
Watson, P. F. et al. "A new chemiluminescent assay for the rapid detection of thyroid stimulating antibodies in Graves' disease", Clinical endocrinology vol. 49, No. 5 (Nov. 1, 1998), pp. 577-581.
Zasshi, Nihon Yakurigaku "Novel method for the measurement of intracellular cAMP levels by using a fusion gene of PKA and firefly luciferase" (Folia Pharmacologica Japonica) 136, 285-289 (2010).

* cited by examiner

*Primary Examiner* — Gary Counts
(74) *Attorney, Agent, or Firm* — Edwin S. Flores; Daniel J. Chalker; Chalker Flores, LLP

(57) ABSTRACT

Provided herein is a method and kit that accurately measure autoantibody activity against a TSH receptor without pretreating a blood sample. The autoantibody activity against a TSH receptor in a blood sample is measured by using a kit for measurement of autoantibody activity against a TSH receptor in a mammal cell, comprising a mammal cell expressing both a cAMP biosensor and the TSH receptor, and a substrate capable of visualizing and/or quantifying the CAMP biosensor as constituents, and performing the steps of: (a) incubating a mammal cell expressing both a cAMP biosensor and the TSH receptor in the presence of a blood sample collected from a test subject; (b) measuring an activation level of the CAMP biosensor after the step (a); and (c) comparing the activation level measured in the step (b) with an activation level in a control to calculate the autoantibody activity.

16 Claims, 4 Drawing Sheets

METHOD AND KIT FOR RAPID MEASUREMENT OF AUTOANTIBODY ACTIVITY WITH RESPECT TO TSH RECEPTOR

CROSS-REFERENCE TO RELATED APPLICATIONS

This application is the National Stage of International Application No. PCT/JP2019/034400, filed on Sep. 2, 2019 claiming the priority of JP 2019-020595, filed on Feb. 7, 2019, and JP 2018-165733, filed on Sep. 5, 2018 the content of each of which is incorporated by reference herein.

TECHNICAL FIELD

The present invention relates to a method and a kit for measuring autoantibody activity against a thyroid stimulating hormone (TSH) receptor, which are capable of determining a thyroid disease caused by a TSH receptor stimulating or inhibiting autoantibody.

BACKGROUND ART

TSH receptors are receptors of TSH present on thyroid cell membranes. When TSH secreted by the pituitary gland binds to a TSH receptor, the secretion and synthesis of TSH are performed by the stimulation. Basedow's disease (also called Graves' disease), a typical example of a thyroid disease, is a disease that develops due to an autoantibody having stimulatory activity against a TSH receptor (thyroid stimulation antibody; TSAb). In Basedow's disease patients, TSAb overstimulates the TSH receptor, thereby leading to overactive thyroid functions.

For example, a method which involves incubating Chinese hamster ovary (CHO) cells in the presence of a test sample, and measuring an amount of cyclic adenosine monophosphate (cAMP) via enzyme activity of a reporter gene, thereby measuring TSAb activity, wherein the cAMP is produced by the stimulation of a TSH receptor present on the CHO cell membrane by TSAb contained in the test sample is known as a method for measuring TSAb activity in a blood sample of a thyroid disease patient. In this respect, in order to reduce a background value of measurement, the cells are allowed to proliferate into a cell count that forms a confluent monolayer, and then temporarily starved (patent document 1). However, the bioassay described in patent document 1 requires a 24-hour incubation step for cell proliferation and a 16-hour incubation step of adapting the cells to a medium from a growth medium to a starvation medium for background reduction, and also requires incubation for 4 hours after sample addition in the step of measuring TSAb activity. Since the bioassay described in patent document 1 requires a total of 44 hours or longer for these steps, its object is speed-up.

For example, a method which involves incubating swine thyroid cells in the presence of serum derived from a thyroid disease patient, and measuring an amount of cyclic adenosine monophosphate (cAMP), thereby measuring TSAb activity, wherein the cAMP is produced by the stimulation of a TSH receptor present on the swine thyroid cell membrane by TSAb contained in the serum is known as a more rapid method for measuring TSAb activity in a blood sample of a thyroid disease patient. In this respect, the serum contains endogenous cAMP. Therefore, in order to perform precise quantification, the endogenous cAMP is removed by pretreatment using active carbon (patent document 2). However, the bioassay described in patent document 2 also requires a total of 5 to 6 hours for the step of incubating a blood sample of a thyroid disease patient and swine thyroid cells, and the step of measuring the amount of cAMP produced. Therefore, measurement is not sufficiently speed up. Thus, its object is further speed-up.

Recently, a bioassay system of detecting signals of cAMP, etc. by light emission mediated by calcium ions, and a method for measuring TSAb using the system have been reported as improved methods of the bioassay described in patent document 2 (patent documents 3 to 6). However, these methods present problems such as: 1) the methods still require pretreatment; 2) the methods still require approximately 4 hours, though the time is shortened; and 3) it is not clear whether the methods can accurately determine thyrotoxic ophthalmopathy. Thus, the methods are not always satisfactory. Hence, although it is originally preferred for differential diagnosis of Basedow's disease to measure stimulation antibody TSAb activity, the measurement of the amount of an anti-TSH receptor antibody (TRAb), not the TSAb activity, is actually carried out as the first choice in clinical practice from the viewpoint of rapidness and burdensome incubation of cells.

Meanwhile, in a thyroid disease caused by a TSH receptor stimulating autoantibody, such as Basedow's disease, it is considered that two or more signaling pathways are likely to exist after TSH receptor stimulation. A signaling pathway mediated by a G protein-coupled receptor (GPCR) has been considered as one of the signaling pathways. Many reports mention a phenomenon in which one GPCR activates a plurality of G proteins. One of the reports states that a TSH receptor is coupled to three types of G protein families (Gs, Gq, and Gi) (non-patent document 1). Depending on the type of a ligand, a phenomenon of so-called ligand bias is known in which signal intensity differs among signaling pathways after GPCR activation (non-patent document 2).

PRIOR ART DOCUMENTS

Patent Documents

Patent Document 1: Japanese unexamined Patent Application Publication (Translation of PCT Application) No. 2004-500580
Patent Document 2: Japanese unexamined Patent Application Publication No. 2016-75707
Patent Document 3: Re-publication of PCT International Publication No. 2012-086756
Patent Document 4: Japanese unexamined Patent Application Publication No. 2017-192396
Patent Document 5: Japanese unexamined Patent Application Publication No. 2016-32472
Patent Document 6: Re-publication of PCT International Publication No. 2016-035677

Non-Patent Documents

Non-patent Document 1: Endocrinology, Volume 157, Issue 5, 1 May 2016
Non-patent Document 2: Proc Natl Acad Sci USA 104: 5443-8, 2007

SUMMARY OF THE INVENTION

Object to be Solved by the Invention

An object of the present invention is to provide a method and a kit that can accurately measure autoantibody activity against a TSH receptor in a short time without performing a time-consuming step such as the medium adaptation of cells or the pretreatment of a blood sample (blood specimen), or by finishing the step in a short time.

Means to Solve the Object

The present inventors have conducted diligent studies to solve the object and consequently completed the present invention by finding that autoantibody activity against a TSH receptor can be accurately measured in a short time by the application of the phenomenon called ligand bias mentioned above. This method eliminates the need of pretreatment of a blood specimen and equilibration treatment of cells or finishes the treatments in a short time, can complete measurement, for example, within 3 hours, because of convenient means for the measurement itself, and further eliminates the need of a special apparatus except for a commercially available apparatus measuring light emission. Therefore, the method is sufficiently available in testing laboratories in hospitals. Hence, the present invention enables, for example, determination of Basedow's disease patients and healthy individuals, assay on the properties (strong or weak stimulatory activity, etc.) of an autoantibody in a Basedow's disease patient-derived blood specimen, and identification of a plurality of autoantibodies differing in properties (stimulating autoantibody, inhibiting autoantibody, etc.) by incubating mammal cells expressing both a cAMP biosensor and the TSH receptor in the presence of blood specimens derived from test subjects (Basedow's disease patient and healthy individual), and measuring an activation level of the cAMP biosensor or time-dependent change therein.

Specifically, the present invention is as follows.

[1] A method for measuring autoantibody activity against a thyroid stimulating hormone (TSH) receptor in a mammal cell, comprising the following steps (a) to (c):
   (a) incubating a mammal cell expressing both a cAMP biosensor and the TSH receptor in the presence of a blood sample collected from a test subject;
   (b) measuring an activation level of the cAMP biosensor after the step (a); and
   (c) comparing the activation level measured in the step (b) with an activation level in a control to calculate the autoantibody activity.
[2] The method according to [1], wherein the autoantibody activity is stimulatory activity or inhibitory activity.
[3] The method according to [1] or [2], wherein the method is completed within 3 hours.
[4] The method according to any one of [1] to [3], wherein the mammal cell is a human embryonic kidney cell-derived cell line.
[5] The method according to any one of [1] to [4], optionally further comprising, before the step (a), the step of (p) subjecting the mammal cell to equilibration treatment in a solution for incubation, wherein in the step (a), the mammal cell and the blood sample are incubated in the solution for incubation, and the sum of a time required for carrying out the steps (a) and (b) and an equilibration treatment time is within 2 hours.
[6] The method according to any one of [1] to [5], wherein the mammal cell is a GNAS gene- and GNAL gene-knockout mammal cell expressing exogenous Gαs.
[7] A kit for measurement of autoantibody activity against a thyroid stimulating hormone (TSH) receptor in a mammal cell, comprising a mammal cell expressing both a cAMP biosensor and the TSH receptor, and a substrate capable of visualizing and/or quantifying the cAMP biosensor as constituents.
[8] The kit for measurement according to [7], wherein the autoantibody activity is a stimulatory activity or inhibitory activity.
[9] The kit for measurement according to [7] or [8], wherein the mammal cell is a human embryonic kidney cell-derived cell line.
[10] The kit for measurement according to any one of [7] to [9], wherein the mammal cell is a GNAS gene- and GNAL gene-knockout mammal cell expressing exogenous Gαs.

Effect of the Invention

The measurement method of the present invention eliminates the need of the medium adaptation of cells or the pretreatment of a blood specimen, or finishes these treatments in a short time, can complete measurement, for example, within 3 hours, because of convenient means for the measurement itself, and further eliminates the need of a special apparatus except for a commercially available apparatus measuring light emission. Therefore, the method is sufficiently available in testing laboratories in hospitals. Furthermore, the measurement method of the present invention can accurately determine Basedow's disease patients and healthy individuals, and is capable of assaying or identifying the properties (strong or weak stimulatory activity, etc.) of an autoantibody in a patient-derived blood specimen, or a plurality of autoantibodies differing in properties (stimulating autoantibody, inhibiting autoantibody, etc.), by incubating a mammal cell expressing both a cAMP biosensor and the TSH receptor in the presence of a blood specimen derived from a test subject (e.g., a Basedow's disease patient or a healthy individual), and measuring an activation level of the cAMP biosensor or time-dependent change therein.

In the case of using a human embryonic kidney cell-derived cell line as the mammal cell, the measurement method of the present invention exhibits a particularly high activation level of the cAMP biosensor. This permits sensitive measurement of the activation level of the cAMP biosensor even when TSAb activity in a blood sample of a thyroid disease patient is a low value. Therefore, a false-negative rate of testing can be reduced, and Basedow's disease patients and healthy individuals can be more accurately determined.

It is expected that the severity of symptoms of a thyroid disease caused by a TSH receptor stimulating or inhibiting autoantibody can be accurately determined in the future by measuring an activation level of the cAMP biosensor or time-dependent change therein. For example, it can be expected that the thyroid disease is treated or symptoms of the thyroid disease are relieved, by identifying a test subject likely to have the thyroid disease, and subjecting the test subject to treatment procedures appropriate for the severity of the thyroid disease (e.g., an anti-thyroid disease drug, isotope treatment [radioactive iodine treatment], or resection [surgery] of thyroid hormone-producing tissues).

MODE OF CARRYING OUT THE INVENTION

The measurement method of the present invention is a method for measuring autoantibody activity against a TSH receptor in a mammal cell, comprising the following steps (a) to (c): (a) incubating a mammal cell expressing both a cAMP biosensor and the TSH receptor in the presence of a blood sample collected from a test subject; (b) measuring an activation level of the cAMP biosensor after the step (a); and (c) comparing the activation level measured in the step (b) with an activation level in a control to calculate the autoantibody activity (hereinafter, also referred to as the "present measurement method"), and may be used in a method for determining a thyroid disease caused by a TSH receptor stimulating or inhibiting autoantibody (excluding diagnostic action by a physician).

The kit for measurement of the present invention is a kit for use in the measurement of autoantibody activity against a TSH receptor in a mammal cell, comprising a mammal cell expressing both a cAMP biosensor and the TSH receptor, and a substrate capable of visualizing and/or quantifying the cAMP biosensor as constituents (hereinafter, also referred to as the "present measurement kit"). The present measurement kit is a use invention relating to a kit for use in the measurement of autoantibody activity against a TSH receptor in a mammal cell. The kit may comprise a component generally used in this kind of measurement kit, for example, a carrier, a pH buffer, a stabilizer, a sensitizer, or a diluent as well as an attached document such as an instruction manual or an instruction for measuring autoantibody activity against a TSH receptor in a mammal cell.

In the present specification, the thyroid disease caused by a TSH receptor stimulating or inhibiting autoantibody can be a thyroid disease caused by elevation or decrease in free thyroid hormone concentration in blood through the stimulation or inhibition of a TSH receptor by the TSH receptor stimulating autoantibody or the TSH receptor inhibiting autoantibody. Examples thereof can include Basedow's disease, TSH-producing tumor, gestational thyrotoxicosis, hypothyroidism, and Hashimoto's thyroiditis and can preferably include Basedow's disease.

In the present specification, the "TSH receptor stimulating autoantibody" means an autoantibody (i.e., an antibody that is produced in the body of a test subject to be measured and targets a substance such as a protein present in the body of the test subject) that can directly or indirectly stimulate (activate) the TSH receptor, for example, an agonist that can bind to the TSH receptor (e.g., an anti-TSH antibody having agonistic action [TSAb]).

In the present specification, the "TSH receptor inhibiting autoantibody" means an autoantibody that can directly or indirectly inhibit (inactivate) the TSH receptor, for example, an antagonist that directly or indirectly inhibits the binding of TSH to the TSH receptor (e.g., an anti-TSH antibody having antagonistic action [TSBAb]).

In the present specification, the "cAMP biosensor" means a visualizable (imageable) and/or quantifiable protein whose own index (e.g., an enzyme activity level, a color development level, or a light emission [fluorescence] level) is changed in a manner dependent on the amount of cAMP produced and/or its concentration in a mammal cell. The cAMP biosensor usually has a cAMP binding region. The binding of cAMP to the cAMP binding region changes the conformation of the cAMP biosensor so that an allosteric effect such as change from an inactive state to an active state or change from an invisible state to a visible state is produced.

Examples of the cAMP biosensor can include a reporter protein containing a cAMP binding region (e.g., a cAMP binding region derived from a control subunit of protein kinase A [PKA] or a cAMP binding region derived from Epac1), for example: HRP [horseradish peroxidase]; alkaline phosphatase; β-D-galactosidase; luciferase such as stable luciferase green [SLG], stable luciferase orange [SLO], and stable luciferase red [SLR]; and a fluorescent protein such as green fluorescent protein [GFP], red fluorescent protein [DsRed], and cyan fluorescent protein [CFP], and can specifically include GloSensor cAMP (manufactured by Promega Corp.) which is luciferase containing cAMP binding region derived from a control subunit of PKA, and Pink Flamindo (pink fluorescent cAMP indicator) which is red fluorescent protein containing a cAMP binding region derived from Epac1 (see the document "Harada K., et al., Sci Rep. 2017 Aug. 4; 7 (1): 7351. doi: 10.1038/s41598-017-07820-6."). GloSensor cAMP (manufactured by Promega Corp.) is preferred because its effect has been demonstrated in the present Examples. The cAMP biosensor preferably has higher specificity for cAMP than that for cGMP. In this context, the specificity for cGMP is, for example, 1/10 or less, preferably 1/30 or less, more preferably 1/60 or less, further preferably 1/100 or less, when the specificity for cAMP is defined as 1.

The mammal cell can be a mammal cell transiently or stably expressing both the cAMP biosensor and the TSH receptor, and may be a mammal cell expressing an exogenous cAMP biosensor and expressing an intrinsic TSH receptor (e.g., a mammalian thyroid cell) or may be a mammalian non-thyroid cell expressing an exogenous cAMP biosensor and expressing an exogenous TSH receptor (e.g., a human embryonic kidney cell-derived cell line [HEK293 cell, HEK293T cell, etc.], a Chinese hamster ovary-derived cell line [CHO cell], and a human osteosarcoma cell line [U2OS cell]). Among them, preferred examples thereof can include a human embryonic kidney cell-derived cell line because the cell line exhibits a high light emission value or fold signal induction when combined with GloSensor cAMP (manufactured by Promega Corp.). In this context, the "human embryonic kidney cell-derived cell line" means a cell of an established line (i.e., immortalized) by an operation such as a method of repeating the subculture of a cell collected from the kidney tissue of a human embryo, or a population thereof; a method of inducing the immortalization of the cell or the population through the use of a virus gene such as adenovirus E1 gene or SV40 (simian virus 40) T antigen gene; or a method of inducing the immortalization of the cell or the population by expressing telomerase reverse transcriptase (TERT).

The mammal cell may be a G protein-encoding gene-knockout cell line and specifically, may be a GNAL gene (gene encoding Gαolf protein)-knockout mammal cell, may be a GNAS gene (gene encoding Gαs protein)-knockout mammal cell, or may be a GNAL gene- and GNAS gene-knockout mammal cell. Alternatively, the mammal cell may be a mammal cell expressing exogenous G protein, specifically, exogenous Gαs or chimeric Gαs with Gαi, Gαo, Gαz, Gαq, Gα12, or Gα13. The possibility that a plurality of G proteins are activated has been suggested for a thyroid disease caused by a TSH receptor stimulating autoantibody. The knockout of the gene and/or the expression of the exogenous G protein or the chimeric G protein enables detailed investigation as to the activation of each G protein by selecting G protein expressed in the cell. Therefore, the present invention is useful as an investigation tool for signal intensity in each signaling pathway after GPCR activation.

The GNAS gene- or GNAL gene-knockout mammal cell can be a mammal cell in which the GNAS gene or the GNAL gene residing on the chromosome of the mammal cell has been disrupted by inserting nucleotide(s) to the GNAS gene or the GNAL gene residing on the chromosome of the mammal cell or deleting nucleotide(s) of this GNAS gene or GNAL gene. A method of disrupting a gene by deleting or inserting nucleotide(s) through the use of homologous recombination may be used for disrupting the GNAS gene or the GNAL gene residing on the chromosome of the mammal cell. From the viewpoint of cost efficiency or time efficiency, it is preferred to use a method of disrupting a gene (gene targeting method) using zinc finger nuclease (the document "Urnov, F. D. et al., (2010) Nature Review Genetics. 11, 636-646"), a modified protein of the zinc finger nuclease (Japanese unexamined Patent Application Publication No. 2013-94148), guide RNA (sgRNA; single-guide RNA) and Cas9 endonuclease (the document "Cong et al., (2013) Science 339, 819-823"), or the like through the use of an event in which a nucleotide is deleted or inserted at the time of homologous recombination repair after cleavage of double-stranded DNA in a GNAS gene or GNAL gene region. Particularly, it is more preferred to use a gene targeting method using sgRNA and Cas9 endonuclease.

When the GNAS gene or the GNAL gene residing on the chromosome of the mammal cell is disrupted, a targeted nucleotide sequence can be selected with reference to a nucleotide sequence information on human-derived GNAS gene or GNAL gene on the basis of the following Gene ID through a link to the database of NCBI (www.ncbi.nlm.nih.gov/guide/), or with reference to ortholog genes (chimpanzee, mouse, rat, bovine, etc.) of these genes.

GNAS gene (Gene ID2778)
GNAL gene (Gene ID2774)

The mammal cell expressing an exogenous cAMP biosensor, an exogenous TSH receptor, and/or exogenous G protein, for example, Gαs, can be prepared by a genetic engineering approach generally used in this field. This mammal cell can be obtained, for example, by introducing (transfection) a vector (e.g., pcDNA3.1(+), pcDM8, pAGE107, pAS3-3, or pCDM8) containing a promoter (e.g., cytomegalovirus [CMV] IE [immediate early] gene promoter, SV40 [simian virus 40] early promoter, retrovirus promoter, metallothionein promoter, heat shock promoter, SRα promoter, NFAT promoter, or HIF promoter) and a cAMP biosensor-encoding gene, a TSH receptor-encoding gene, and/or a Gαs-encoding gene (GNAS gene) operably linked downstream of the promoter to a mammal cell by use of a method such as an electroporation method, a calcium phosphate method, a lipofection method, a DEAE (diethylaminoethyl) dextran method, or a viral infection method.

In the present specification, examples of the mammal cell can include a cell derived from a rodent such as a mouse, a rat, a hamster, or a guinea pig, a lagomorph such as a rabbit, a hoofed animal such as a pig, cattle, a goat, a horse, or sheep, an animal of the order Carnivora such as a dog or a cat, or a primate such as a human, a monkey, a rhesus macaque, a cynomolgus, a marmoset, an orangutan, or a chimpanzee. Among them, preferred examples thereof can include a cell derived from a mouse, a pig, or a human.

Examples of the blood sample can include blood itself, and serum or plasma prepared from blood. Serum is preferred.

In the step (a), the method for incubating the mammal cell when the blood sample contains a TSH receptor stimulating autoantibody can be a method of incubating the mammal cell under conditions where the TSH receptor stimulating autoantibody stimulates the TSH receptor in the mammal cell, and cAMP produced in the cell by the stimulation binds to the cAMP biosensor so that the cAMP biosensor can be activated. The method when the blood sample contains a TSH receptor inhibiting autoantibody can be a method of incubating the mammal cell under conditions where the TSH receptor inhibiting autoantibody inhibits the TSH receptor in the mammal cell, and the inhibition decreases the amount of cAMP produced in the cell and thus decreases the amount of cAMP bound to the cAMP biosensor so that the cAMP biosensor can be inactivated. Conditions such as an incubation time, an incubation temperature, and the type of a solution for incubation can be appropriately selected in consideration of the properties of the mammal cell and also the properties of the activation level to be measured.

The incubation time is, for example, in the range of 5 minutes to 2 hours, preferably in the range of 10 minutes to 1.5 hours, more preferably in the range of 20 minutes to 1 hour. The incubation temperature is, for example, in the range of 14 to 40° C., preferably in the range of 20 to 38° C.

Examples of the solution for incubation can include a physiological aqueous solution containing 0.1 to 30% (v/v) serum (fetal bovine serum [FBS], calf bovine serum [CS], etc.), and a serum-free physiological aqueous solution. Examples of such a physiological aqueous solution can include: a culture solution for mammal cell culture; saline; phosphate-buffered saline; Tris-buffered saline; HEPES-buffered saline; a Ringer's solution such as a lactated Ringer's solution, an acetated Ringer's solution, and a bicarbonated Ringer's solution; and a 5% aqueous glucose solution. Specific examples of the culture solution for mammal cell culture can include DMEM, EMEM, IMDM, RPMI1640, αMEM, F-12, F-10, M-199, and AIM-V. Examples of the serum-free culture solution for mammal cell culture can include the culture solution for mammal cell culture supplemented with an appropriate amount (e.g., 1 to 30%) of a commercially available serum replacement such as B27 supplement (-insulin) (manufactured by Life Technologies Corp.), N2 supplement (manufactured by Life Technologies Corp.), B27 supplement (manufactured by Life Technologies Corp.), or Knockout Serum Replacement (manufactured by Invitrogen Corp.). The solution for incubation may contain a phosphodiesterase inhibitor (e.g., 3-isobutyl-1-methylxanthine [IBMX] or theophylline) commonly used in a known document relating to a cAMP detection system, such as patent document 1. However, the solution for incubation preferably contains no phosphodiesterase inhibitor if the presence of the phosphodiesterase inhibitor elevates a background value and renders quantitative measurement difficult without securing a sufficient S/N ratio.

The solution for incubation contains a substrate, a catalyst, or the like for the visualizable (imageable) and/or quantifiable cAMP biosensor. When the cAMP biosensor is, for example, alkaline phosphatase, the solution for incubation contains a substrate such as p-nitrophenylphosphoric acid. This solution for incubation may be prepared using a commercially available product such as LabAssay ALP (manufactured by Wako Pure Chemical Industries, Ltd.) or QuantiChrom Alkaline Phosphatase Assay Kit (manufactured by Funakoshi Co., Ltd.). When the cAMP biosensor is β-D-galactosidase, the solution for incubation contains a substrate such as X-gal (5-bromo-4-chloro-3-indolyl-β-D-galactoside) or ONPG (o-nitrophenyl-β-D-galactopyranoside). This solution for incubation may be prepared using a commercially available product such as X-gal (manufactured by Takara Bio Inc.) or β-Galactosidase Enzyme Assay System (manufactured by Promega Corp.). When the cAMP biosensor is luciferase, the solution for incubation contains a substrate such as luciferin or coelenterazine. This solution for incubation may be prepared using a commercially available product such as GloSensor cAMP Reagent stock solution (manufactured by Promega Corp.). The solution for incubation may be supplemented with a catalyst (e.g., ATP or magnesium), in addition to the substrate, and may not be supplemented with the catalyst when the mammal cell contains a sufficient amount of the catalyst.

In the step (a), the mammal cell and the blood sample can be contacted with each other in a container (e.g., a multi-well plate, a culture vessel [Petri dish or dish], or a flask) containing the solution for incubation. Specifically, the blood sample may be added and/or mixed into the solution for incubation in advance, and then, the resulting liquid can be added to the mammal cell, or the blood sample may be added and/or mixed into the solution for incubation containing the mammal cell. The present measurement method may further comprise, before the step (a), the step of (p) subjecting the mammal cell to equilibration treatment in a solution for incubation, or from the viewpoint of time efficiency, may not comprise the step (p). The equilibration treatment time is, for example, 5 minutes or longer, 10 minutes or longer, or 30 minutes or longer, and 2.5 hours or shorter, 2 hours or shorter, or 1 hour or shorter. Specifically, the equilibration treatment time is, for example, in the range of 5 minutes to 2.5 hours, in the range of 10 minutes to 2 hours, or in the range of 30 minutes to 1 hour. The temperature of the equilibration treatment is, for example, in the range of 14 to 40° C., preferably in the range of 20 to 38° C. The cAMP biosensor expressed in the mammal cell exhibits reactivity only with cAMP produced in the cell, and exhibits no reactivity with extracellular cAMP. This eliminates the need of pretreatment such as preliminary removal of cAMP contained in the blood sample before contact of the mammal cell with the blood sample, or lysis treatment of the mammal cell before or after contact of the mammal cell with the blood sample. This step may be performed in the coexistence of polyethylene glycol (PEG), as in a known method for measuring TSAb activity (patent document 2), or may be performed in the absence of PEG.

In the step (b), the method for measuring the activation level of the cAMP biosensor can be appropriately selected as a suitable method according to the properties of the activation level to be measured. When the activation level is, for example, an activation level of alkaline phosphatase with p-nitrophenylphosphoric acid used as a substrate, examples thereof can include a method of measuring the absorbance of p-nitrophenol (405 nm) formed through decomposition by the alkaline phosphatase using a spectrophotometer. When the activation level is an activation level of β-D-galactosidase with ONPG used as a substrate, examples thereof can include a method of measuring the absorbance of o-nitrophenol (20 nm) formed through decomposition by the β-D-galactosidase using a spectrophotometer. When the activation level is an activation level of luciferase with luciferin used as a substrate, examples thereof can include a method of measuring light emission mediated by the luciferase using a luminometer. When the activation level is a fluorescence level of a fluorescent protein, examples thereof can include a method of measuring the fluorescence level with a fluorescence microscope.

In the step (b), time-dependent change in the activation level of the cAMP biosensor can be measured by measuring the activation level at a plurality of (e.g., at least 2, at least 4, at least 6, at least 8, at least 10, at least 12, at least 14, at least 16, at least 18, at least 20, at least 22, at least 24, at least 26, at least 28, at least 30, at least 32, at least 34, at least 36, at least 38, or at least 40) points in time. The time between the points in time when the time-dependent change in activation level is measured is not particularly limited and is, for example, in the range of 1 to 60 seconds, in the range of 1 to 60 minutes, or in the range of 1 to 2 hours. The intervals between the points in time when the time-dependent change in activation level is measured may be even intervals or uneven intervals.

In the step (b), in the case of measuring an activation level in a test subject over time, increase in activation level in the test subject can be monitored in real time. Therefore, whether or not the activation level in the test subject is higher than that in a control can be evaluated precisely and quantitatively by measurement at a point (timing) when the activation level in the test subject is increased.

In the step (c), the activation level measured in the step (b) is compared with an activation level in a control to calculate the autoantibody activity. When the activation level measured in the step (b) is higher than that in the control, it can be determined (confirmed) that the serum sample of the test subject has a larger ratio of an autoantibody that exhibits stimulating properties for the TSH receptor than that in the control, and/or has a smaller ratio of an autoantibody that exhibits inhibiting properties for the TSH receptor than that in the control. When the activation level measured in the step (b) is lower than that in the control, it can be determined (confirmed) that the serum sample of the test subject has a smaller ratio of an autoantibody that exhibits stimulating properties for the TSH receptor than that in the control, and/or has a larger ratio of an autoantibody that exhibits inhibiting properties for the TSH receptor than that in the control. In the step (c), counterparts are used as both the items to be compared (the activation level in the test subject and the activation level in the control). The activation level in the control may be a value measured in each case on the basis of a blood sample collected from the control (e.g., a healthy individual or a patient with a thyroid disease caused by a TSH receptor stimulating or inhibiting autoantibody) in carrying out the present measurement method, or may be a value measured in advance. Both the items to be compared (the activation level in the test subject and the activation level in the control) are preferably obtained from blood samples prepared by substantially the same method, or by substantially the same method for measuring an activation level.

In the present measurement kit, examples of the substrate capable of visualizing and/or quantifying the cAMP biosensor can include p-nitrophenylphosphoric acid when the cAMP biosensor is alkaline phosphatase, can include X-gal (5-bromo-4-chloro-3-indolyl-β-D-galactoside) and ONPG (o-nitrophenyl-β-D-galactopyranoside) when the cAMP biosensor is β-D-galactosidase, and can include luciferin and coelenterazine when the cAMP biosensor is luciferase.

By use of the present measurement method or the present measurement kit, autoantibody activity against a TSH receptor in a mammal cell can be rapidly measured. In the present specification, the term "rapid" means that the measurement time, specifically, the sum of the time required for carrying out the steps (a) and (b) and the equilibration treatment time mentioned above (hereinafter, also referred to as a "total time") or the time when the present measurement method is completed (hereinafter, also referred to as a "completion time") is a relatively short time. In this context, examples of the relatively short time for the total time can include 2 hours or shorter, 1 hour and 30 minutes or shorter, 1 hour or shorter, or 30 minutes or shorter; and 5 minutes or longer, 10 minutes or longer, 15 minutes or longer, 20 minutes or longer, or 25 minutes or longer, and 2 hours or shorter, 1 hour and 30 minutes or shorter, 1 hour or shorter, or 30 minutes or shorter (i.e., 5 minutes to 2 hours, 5 minutes to 1 hour and 30 minutes, 5 minutes to 1 hour, 5 to 30 minutes, 10 minutes to 2 hours, 10 minutes to 1 hour and 30 minutes, 10 minutes to 1 hour, 10 to 30 minutes, 15 minutes to 2 hours, 15 minutes to 1 hour and 30 minutes, 15 minutes to 1 hour, 15 to 30 minutes, 20 minutes to 2 hours, 20 minutes to 1 hour and 30 minutes, 20 minutes to 1 hour, 20 to 30 minutes, 25 minutes to 2 hours, 25 minutes to 1 hour and 30 minutes, 25 minutes to 1 hour, or 25 to 30 minutes), and can preferably include 2 hours or shorter. Examples of the relatively short time for the completion time can include 3 hours or shorter, 2 hours and 30 minutes or shorter, 2 hours or shorter, or 1 hour and 30 minutes or shorter; and 5 minutes or longer, 10 minutes or longer, 15 minutes or longer, 20 minutes or longer, or 25 minutes or longer, and 3 hours or shorter, 2 hours and 30 minutes or shorter, 2 hours or shorter, or 1 hour and 30 minutes or shorter (i.e., 5 minutes to 3 hours, 5 minutes to 2 hours and 30 minutes, 5 minutes to 2 hours, 5 to 1 hour and 30 minutes, 10 minutes to 3 hours, 10 minutes to 2 hours and 30 minutes, 10 minutes to 2 hours, 10 to 1 hour and 30 minutes, 15 minutes to 3 hours, 15 minutes to 2 hours and 30 minutes, 15 minutes to 2 hours, 15 to 1 hour and 30 minutes, 20 minutes to 3 hours, 20 minutes to 2 hours and 30 minutes, 20 minutes to 2 hours, 20 to 1 hour and 30 minutes, 25 minutes to 3 hours, 25 minutes to 2 hours and 30 minutes, 25 minutes to 2 hours, or 25 to 1 hour and 30 minutes) and can preferably include 3 hours or shorter.

Hereinafter, the present invention will be described more specifically with reference to Examples. However, the technical scope of the present invention is not limited by these examples. In Examples given below, cell culture was performed in a D-MEM culture solution containing 10% fetal bovine serum (FBS) in a $CO_2$ incubator (under conditions of 5% $CO_2$ and 37° C.)

EXAMPLES

Figure 1A:
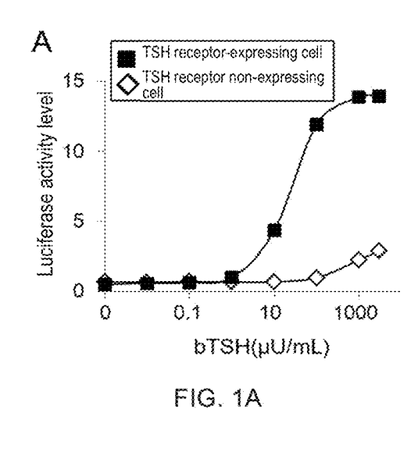
FIG. 1A is a diagram showing results of incubating HEK293 cells expressing both a cAMP biosensor and a TSH receptor (hereinafter, also referred to as "TSH receptor-expressing HEK293 cells") or HEK293 cells expressing the cAMP biosensor alone without expressing the TSH receptor (hereinafter, also referred to as "TSH receptor non-expressing HEK293 cells") in the presence of varying concentrations (0 µU/mL, 0.01 µU/mL, 0.1 µU/mL, 1 µU/mL, 10 µU/mL, 100 µU/mL, 1000 µU/mL, and 2000 µU/mL) of bTSH, followed by analysis by GloSensor® cAMP Assay.
Figure 1B:
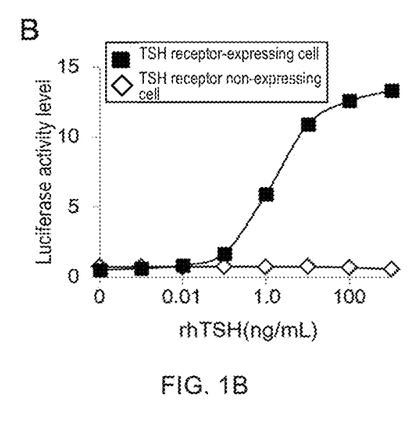
FIG. 1B is a diagram showing results of incubating TSH receptor-expressing HEK293 cells or TSH receptor non-expressing HEK293 cells in the presence of varying concentrations (0 ng/mL, 0.001 ng/mL, 0.01 ng/mL, 0.1 ng/mL, 1 ng/mL, 10 ng/mL, 100 ng/mL, and 1000 ng/mL) of rhTSH, followed by analysis by GloSensor cAMP Assay.
Figure 1C:
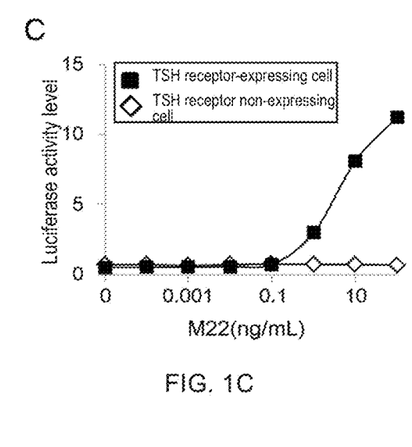
FIG. 1C is a diagram showing results of incubating TSH receptor-expressing HEK293 cells or TSH receptor non-expressing HEK293 cells in the presence of varying concentrations (0 ng/mL, 0.0001 ng/mL, 0.001 ng/mL, 0.01 ng/mL, 0.1 ng/mL, 1 ng/mL, 10 ng/mL, and 100 ng/mL) of anti-human TSH monoclonal M22 antibody, followed by analysis by GloSensor cAMP Assay. "Luciferase activity level" on the ordinate is shown as a relative value when a luciferase activity level before addition of bTSH, rhTSH, or anti-human TSH monoclonal M22 antibody is defined as 1.

Example 1. Quantification of Concentration of TSH Receptor Stimulating Autoantibody Study was conducted whether or not the concentration of a TSH receptor stimulating autoantibody could be quantified with the activation level of a cAMP biosensor as an index. Specifically, a method of the following procedures [1] to [3] was performed.
1-1 Method
 [1] $1.5 \times 10^4$ cells of a human embryonic kidney cell-derived cell line (HEK293 cells) (obtained from ECACC [European Collection of Authenticated Cell Cultures], Cat no. 85120602) were inoculated to each well of a 96-well multiplate and cultured for 24 hours.
 [2] A plasmid vector (pGloSenso-22F, manufactured by Promega Corp.) for expression of GloSensor cAMP, i.e., a protein (cAMP biosensor) containing amino acid residues 359 to 544 of firefly luciferase, a cAMP binding region of a control subunit of protein kinase A (PKA), and amino acid residues 4 to 355 of firefly luciferase, and pcDNA3.1(+) for expression of a human TSH receptor (pcDNA3.1_hTSHR) were used in the transfection of the HEK293 cells according to the protocol attached to GloSensor cAMP Assay (manufactured by Promega Corp.) using FuGENE HD Transfection Reagent (manufactured by Promega Corp.) ("TSH receptor-expressing cell" in FIG. 1). For a comparative control, an experiment was also conducted by transfection with pcDNA3.1(+) containing no insert of the human TSH receptor gene and pGloSenso-22F ("TSH receptor non-expressing cell" in FIG. 1).
 [3] After the culture for 24 hours, the medium was replaced with a solution for incubation containing 2% (v/v) GloSensor cAMP Reagent stock solution (manufactured by Promega Corp.) and polyethylene glycol, and equilibration treatment was performed at room temperature for 1 hour. Then, varying concentrations (see FIG. 1) of 3 types of TSH receptor stimulating substances (bovine TSH [bTSH, manufactured by Sigma-Aldrich Co., LLC], recombinant human TSH [rhTSH, manufactured by Sanofi K.K.], and anti-human TSH monoclonal M22 antibody [manufactured by RSR Ltd.]) (TSAb) were added thereto, and luciferase activity levels were measured using a 96-well multiplate luminometer (manufactured by Tecan Japan Co., Ltd.). For a comparative control, a luciferase activity level was also measured before addition of these 3 types of TSH receptor stimulating substances. The luciferase activity levels were measured as values after addition of the TSH receptor stimulating substances and incubation for 20 minutes.
1-2 Results The luciferase activation level was shown to elevate in a manner dependent on the concentrations of 3 types of TSH receptor stimulating substances (bTSH, rhTSH, and anti-human TSH monoclonal M22 antibody) (see FIG. 1). These results indicate that when mammal cells (HEK293 cells) expressing both the cAMP biosensor (GloSensor cAMP) and the TSH receptor are cultured in the presence of a TSH receptor stimulating autoantibody such as anti-human TSH monoclonal M22 antibody, the concentration of the TSH receptor stimulating autoantibody can be measured with the activation level of the cAMP biosensor as an index.

Figure 2A:
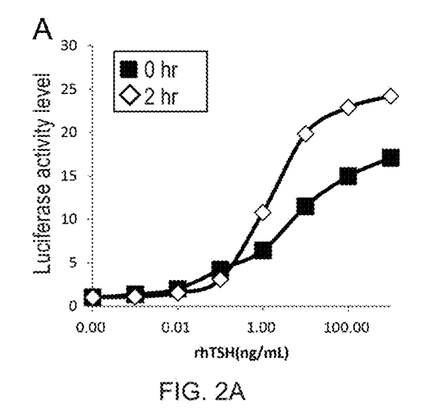
FIG. 2A is a diagram showing results of subjecting TSH receptor-expressing HEK293 cells to equilibration treatment for hours or 2 hours in a solution for incubation, and then incubating the cells in the presence of varying concentrations (0 ng/mL, 0.001 ng/mL, 0.01 ng/mL, 0.1 ng/mL, 1 ng/mL, 10 ng/mL, 100 ng/mL, and 1000 ng/mL) of rhTSH, followed by analysis by GloSensor® cAMP Assay.
Figure 2B:
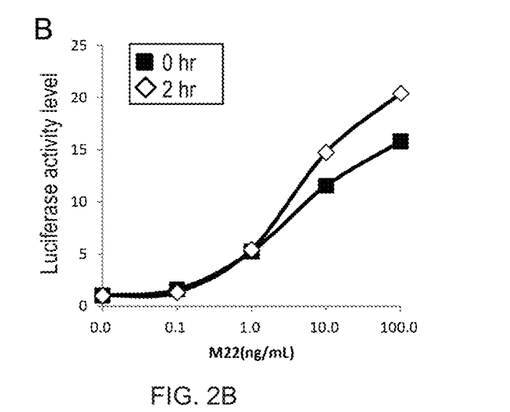
FIG. 2B is a diagram showing results of subjecting TSH receptor-expressing HEK293 cells to equilibration treatment for 0 hours or 2 hours in a solution for incubation, and then incubating the cells in the presence of varying concentrations (0 ng/mL, 0.01 ng/mL, 0.1 ng/mL, 1 ng/mL, ng/mL, and 100 ng/mL) of anti-human TSH monoclonal M22 antibody, followed by analysis by GloSensor cAMP Assay. "Luciferase activity level" on the ordinate is shown as a relative value when a luciferase activity level before addition of rhTSH or anti-human TSH monoclonal M22 antibody is defined as 1.

Example 2. Study on Equilibration Treatment of Mammal Cell in Solution for Incubation Study was conducted on the equilibration treatment of mammal cells in a solution for incubation. Specifically, after the following procedures [1] and [2], a method without equilibration treatment (treatment time: 0 hours) [3-1] and a method involving equilibration treatment (treatment time: 2 hours) [3-2] were performed in parallel, and the measurement results of both the methods were compared to study the influence of the presence or absence of the equilibration treatment on the measurement results.
2-1 Method
 [1] $1.5 \times 10^4$ cells of a human embryonic kidney cell-derived cell line (HEK293 cells) (obtained from ECACC [European Collection of Authenticated Cell Cultures], Cat no. 85120602) were inoculated to each well of a 96-well multiplate and cultured for 24 hours.
 [2] A plasmid vector (pGloSenso-22F, manufactured by Promega Corp.) for expression of GloSensor cAMP, i.e., a protein containing amino acid residues 359 to 544 of firefly luciferase, a cAMP binding region of a control subunit of protein kinase A (PKA), and amino acid residues 4 to 355 of firefly luciferase, and pcDNA3.1 (+) for expression of a human TSH receptor (pcDNA3.1_hTSHR) were used in the transfection of the HEK293 cells according to the protocol attached to GloSensor cAMP Assay (manufactured by Promega Corp.) using FuGENE HD Transfection Reagent (manufactured by Promega Corp.).
 [3-1] After the culture for 24 hours, the medium was replaced with a solution for incubation containing 2% (v/v) GloSensor cAMP Reagent stock solution (manufactured by Promega Corp.) and polyethylene glycol. Immediately thereafter, varying concentrations (see FIG. 2) of 2 types of TSH receptor stimulating substances (recombinant human TSH [rhTSH, manufactured by Sanofi K.K.] and anti-human TSH monoclonal M22 antibody [manufactured by RSR Ltd.]) (TSAb) were added thereto, and luciferase activity levels were measured using a 96-well multiplate luminometer (manufactured by Promega Corp.). The luciferase activity levels were measured as values after addition of the TSH receptor stimulating substances and incubation for 20 minutes.
 [3-2] After the culture for 24 hours, the medium was replaced with a solution for incubation containing 2% (v/v) GloSensor cAMP Reagent stock solution (manufactured by Promega Corp.) and polyethylene glycol, and equilibration treatment was performed at room temperature for 2 hours. Then, varying concentrations (see FIG. 2) of 2 types of TSH receptor stimulating substances (recombinant human TSH [rhTSH, manufactured by Sanofi K.K.] and anti-human TSH monoclonal M22 antibody [manufactured by RSR Ltd.]) (TSAb) were added thereto, and luciferase activity levels were measured using a 96-well multiplate luminometer (manufactured by Promega Corp.). The luciferase activity levels were measured as values after addition of the TSH receptor stimulating substances and incubation for 20 minutes.

2-2 Results

The luciferase activation level was shown to elevate in a manner dependent on the concentrations of TSH receptor stimulating substances (rhTSH and anti-human TSH monoclonal M22 antibody), regardless of the presence or absence of the equilibration treatment of mammal cells in a solution for incubation (see FIG. 2). These results indicate that even when the equilibration treatment of mammal cells in a solution for incubation is omitted or its time is shortened, or the measurement time is shortened (e.g., within 30 minutes), the concentration of the TSH receptor stimulating autoantibody can be measured with the activation level of the cAMP biosensor as an index.

Example 3. Study on Mammal Cell Expressing cAMP Biosensor and TSH Receptor

In order to sensitively measure a TSH receptor stimulating autoantibody, study was conducted on mammal cells expressing the cAMP biosensor and the TSH receptor. Specifically, a Gs gene (GNAS gene and GNAL gene)-knockout HEK293 cell line (hereinafter, also referred to as "Gs-deficient HEK293 cells") was prepared according to the method described in the section [Preparation of Gs gene-knockout HEK293 cell line] given below, and transfected with two types of vectors (pGloSenso-22F and pcDNA3.1_hTSHR) and pcDNA3.1(+) for expression of human Gαs protein (pcDNA3.1_hGαs) according to the method described in the section "1-1 Method" of Example 1, followed by the measurement of luciferase activity levels. For a comparative control, an experiment was also conducted by transfecting the wild line (HEK293 cells) with the 2 types of vectors.

3-1 Method

[Preparation of Gs Gene-Knockout HEK293 Cell Line]
  [1] In order to knock out Gs genes (GNAS gene [Gene ID2778] and GNAL gene [Gene ID2774]) residing in the genome, a plasmid construct (Cas9 nuclease/sgRNA expression vector) was prepared according to the method described in the document (Wang, H. et al., One-step generation of mice carrying mutations in multiple genes by CRISPR/Cas-mediated genome engineering. Cell 153, 910-918 (2013)) or International Publication No. WO 2015/128894 using pX330 vector for expression of both Cas9 nuclease and single guide RNA (sgRNA).
  [2] HEK293 cells were suspended at 2×10$^5$ cells/mL in a D-MEM culture solution containing 10% FBS and inoculated at 1 mL/well to a 12-well plate for cell culture (manufactured by Greiner Bio-One International GmbH).
  [3] The HEK293 cells cultured for 24 hours were transfected with 500 ng of the Cas9 nuclease/sgRNA expression vector and 100 ng of pGreenLantern-1 (manufactured by GIBCO BRL) per well using 1.25 µL of LipofectAMINE 2000 (manufactured by Life Technologies Corp.).
  [4] The cells 24 hours after transfection were detached from the wells using a phosphate buffer solution (PBS) containing 0.05% (v/v) trypsin/0.53 mM EDTA. GFP-positive cells were separated using a cell sorter SH800Z (manufactured by Sony Corp.) to select cells harboring the Cas9 nuclease/sgRNA expression vector. For the selected cells, it was confirmed using a restriction enzyme resulting from recombination that the Gs genes (GNAS gene and GNAL gene) residing in the genome was knocked out by the recombination.

3-2 Results

Figure 3:
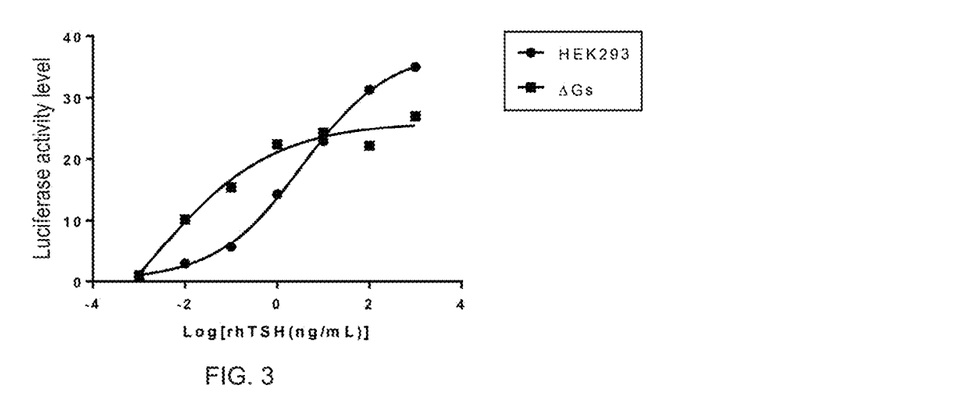
FIG. 3 is a diagram showing results of incubating HEK293 cells allowed to express a TSH receptor ("HEK293" in the diagram) or Gs-deficient HEK293 cells allowed to express the TSH receptor and Gαs ("ΔGs" in the diagram) in the presence of varying concentrations (0.001 ng/mL, 0.01 ng/mL, 0.1 ng/mL, 1 ng/mL, 10 ng/mL, 100 ng/mL, and 1000 ng/mL) of rhTSH, followed by analysis by GloSensor cAMP Assay. "Luciferase activity level" on the ordinate is shown as a relative value when a luciferase activity level before addition of a serum sample is defined as 1. "Log [rhTSH (ng/mL)]" on the abscissa represents common logarithm of the rhTSH concentration.

Assay using Gs-deficient HEK293 cells improved a 50% effective concentration (EC50) by 24.7 times as compared with assay using HEK293 cells (see FIG. 3). These results indicate that, for example, when Gs gene-knockout cells expressing exogenous Gαs are used as mammal cells expressing the cAMP biosensor and the TSH receptor, the detection sensitivity of a ligand of the TSH receptor (TSAb) is improved as compared with wild-type mammal cells, suggesting that TSAb activity can be precisely measured by designing or selecting mammal cells according to the characteristics of a targeted sample.

Example 4. Comparison of Reactivity with Existing Thyroid Stimulating Autoantibody Activity Measurement System Study was conducted whether a method for measuring a TSH receptor stimulating autoantibody using the activation level of the cAMP biosensor as an index would have correlation with an existing thyroid stimulating autoantibody activity measurement system.

4-1 Material

A TSAb international standard NIBSC 08/204 was used as a positive control of a TSH receptor stimulating substance.

4-2 Method

Luciferase activity levels were measured by the method described in the section "1-1 Method" using the TSAb international standard NIBSC08/204 instead of 3 types of TSH receptor stimulating substances. The luciferase activity levels were measured 30 times at 40-second intervals from addition of a serum sample. Thyroid stimulating autoantibody activity (TSAb %) was also measured using the same sample as above and TSAb kit "Yamasa" EIA (manufactured by Yamasa Corp.).

4-3 Results

Figure 4A:
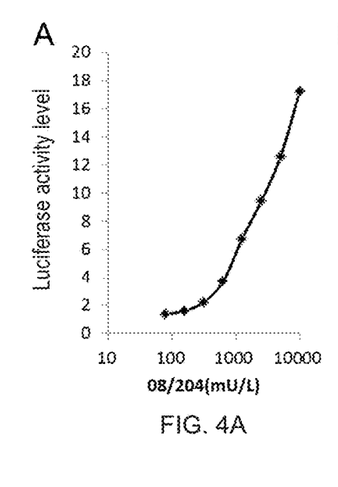
FIG. 4A is a diagram showing results of measuring varying concentrations (78.1 mU/L, 156.3 mU/L, 3125.5 mU/L, 625 mU/L, 1250 mU/L, 2500 mU/L, 5000 mU/L, and 10000 mU/L) of a TSAb international standard NIBSC 08/204 by a method for measuring a TSH receptor stimulating autoantibody using an activation level of a cAMP biosensor as an index. "Luciferase activity level" on the ordinate is shown as a relative value when a luciferase activity level before addition of a serum sample is defined as 1.
Figure 4B:
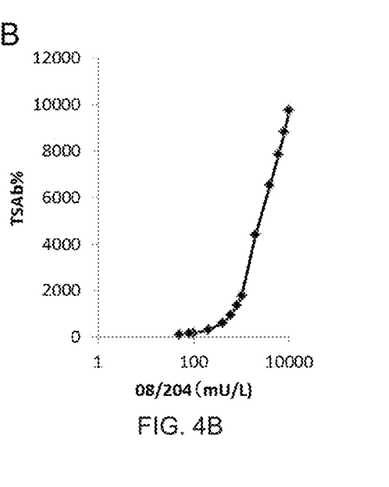
FIG. 4B is a diagram showing results of measuring varying concentrations (50 mU/L, 80 mU/L, 100 mU/L, 200 mU/L, 400 mU/L, 600 mU/L, 800 mU/L, 1000 mU/L, 2000 mU/L, 4000 mU/L, 6000 mU/L, 8000 mU/L, and 10000 mU/L) of the TSAb international standard NIBSC 08/204 by an existing thyroid stimulating autoantibody activity measurement system using an EIA method. "TSAb %" on the ordinate represents a relative value of the cAMP concentration of a TSH receptor stimulating autoantibody-containing specimen when the cAMP concentration of a healthy individual serum specimen is defined as 100.

The method for measuring a TSH receptor stimulating autoantibody using the activation level of the cAMP biosensor as an index exhibited reactivity equivalent to that of the existing thyroid stimulating autoantibody activity measurement system (see FIG. 4). These results suggested that the existing thyroid stimulating autoantibody activity measurement system is replaceable with the method for measuring a TSH receptor stimulating autoantibody using the activation level of the cAMP biosensor as an index.

Example 5. Determination of Thyroid Disease Caused by TSH Receptor Stimulating Autoantibody Study was conducted whether or not a thyroid disease caused by a TSH receptor stimulating autoantibody could be determined with the activation level of the cAMP biosensor as an index. Specifically, the following method was performed using the following material.

5-1 Material

Blood was collected from Basedow's disease patients, and serum samples were prepared according to a conventional method.

5-2 Method

Figure 5:
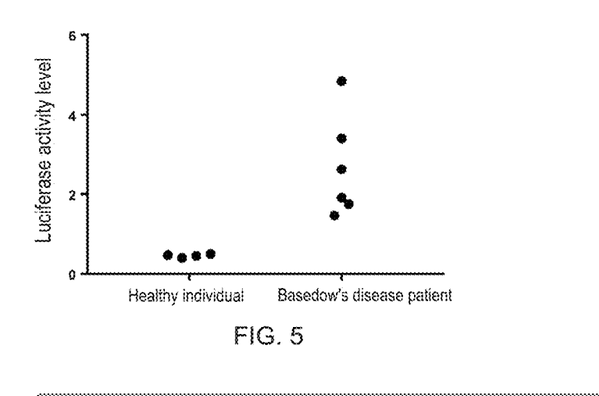
FIG. 5 is a diagram showing results of incubating TSH receptor-expressing HEK293 cells in the presence of serum samples derived from 6 Basedow's disease patients or 4 healthy individuals, followed by analysis by GloSensor cAMP Assay. "Luciferase activity level" on the ordinate is shown as a relative value when a luciferase activity level before addition of the serum samples is defined as 1.

Luciferase activity levels were measured by the method described in the section "1-1 Method" using serum samples prepared from 6 Basedow's disease patients and 4 healthy individuals instead of 3 types of TSH receptor stimulating substances (see FIG. 5). The luciferase activity levels were measured 30 times at 40-second intervals in incubation after addition of the serum samples. FIG. 5 shows the 30th measurement values. Time-dependent change in luciferase activity level is shown as to serum samples derived from Basedow's disease patients P1 and P5 that exhibited the same level of a measurement value with each other (see FIG. 6). The amount of an anti-TSH receptor antibody (TRAb) in these serum samples was measured using ECLusys reagent TRAb (manufactured by F. Hoffmann-La Roche, Ltd.) (see Table 1).

5-3 Results

The luciferase activity levels of serum samples prepared from 6 Basedow's disease patients were clearly distinguished from those from 4 healthy individuals (see FIG. 5). These results suggested that a thyroid disease caused by a TSH receptor stimulating autoantibody can be determined with the activation level of the cAMP biosensor as an index.

Figure 6:
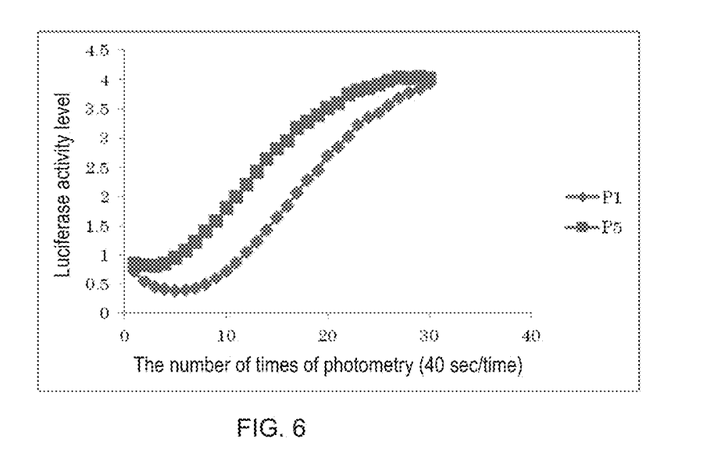
FIG. 6 is a diagram showing results of incubating TSH receptor-expressing HEK293 cells in the presence of a serum sample derived from Basedow's disease patient P1 or a serum sample derived from Basedow's disease patient P5, followed by analysis by GloSensor cAMP Assay. "Luciferase activity level" on the ordinate is shown as a relative value when a luciferase activity level before addition of the serum sample is defined as 1.

The luciferase activity level in a steady state did not differ between Basedow's disease patients P1 and P5, whereas the time for the luciferase activity level to reach the steady state was shorter for the Basedow's disease patient P5 than for the Basedow's disease patient P1 (see FIG. 6). On the other hand, the TRAb value indicating the amount of an anti-TSH receptor antibody was higher for the Basedow's disease patient P5 (15.1) than for the Basedow's disease patient P1 (1.1) (see Table 1). In consideration of the results about the TRAb value, the time for the luciferase activity level to reach the steady state in FIG. 6 is considered to have positive correlation with the amount or concentration of the anti-TSH receptor antibody. In FIG. 6, the steady level of luciferase activity is considered to indicate the degree of stimulatory activity of the anti-TSH receptor antibody (antibody concentration×antibody affinity). Specifically, the Basedow's disease patient P5 presumably contained a larger amount of an anti-TSH receptor antibody having lower stimulating properties (lower affinity for the TSH receptor) than in the Basedow's disease patient P1, whereas the Basedow's disease patient P5 presumably contained a smaller amount of an anti-TSH receptor antibody having stronger stimulating properties (higher affinity for the TSH receptor) than in the Basedow's disease patient P1.

Thus, it can be expected that when the time for the luciferase activity level (activation level of the cAMP biosensor) to reach the steady state and the steady level of luciferase activity (steady level of cAMP biosensor activity) are measured by use of the method of the present invention, an anti-TSH receptor antibody concentration in a blood sample of a Basedow's disease patient and the affinity of the anti-TSH receptor antibody for the TSH receptor can be assessed and difference in Basedow's disease among individuals (e.g., whether or not to be intractable) can be determined.

TABLE 1

| Basedow's disease patient | TRAb (IU/L) |
|---|---|
| P1 | 1.1 |
| P5 | 15.1 |

Example 6. Study on Type of Line of Mammal Cell—1

The type of a line of mammal cells was studied. Specifically, the following method was performed using the following material.

6-1 Material

The mammal cells used were a human embryonic kidney cell-derived cell line (HEK293 cells) and a Chinese hamster ovary-derived cell line (CHO cells) (obtained from ECACC [European Collection of Authenticated Cell Cultures], Cat no. 85050302). The measurement samples used were a TSAb international standard NIBSC 08/204 (400 mU/L) as well as serum samples prepared according to a conventional method from blood collected from 3 Basedow's disease patients. The serum samples were testing positive samples that exhibited 120% or more thyroid stimulating autoantibody activity (TSAb %) using TSAb kit "Yamasa" EIA (manufactured by Yamasa Corp.).

6-2 Method

Figure 7:
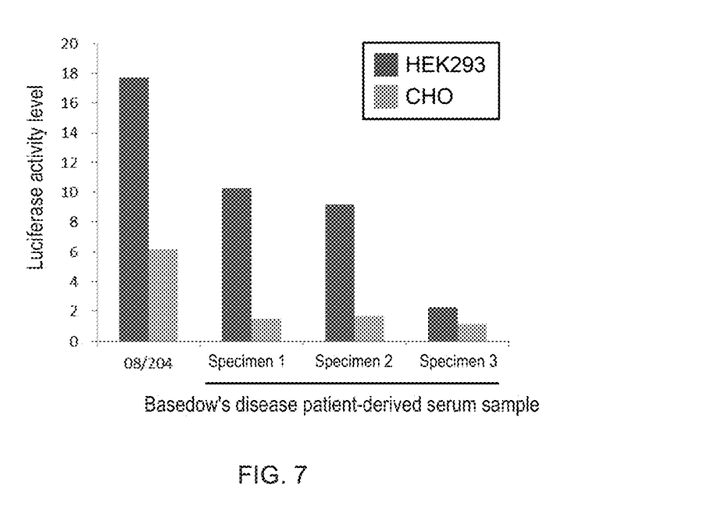
FIG. 7 is a diagram showing results of incubating HEK293 cells expressing both a cAMP biosensor and a TSH receptor or CHO cells expressing both the cAMP biosensor and the TSH receptor in the presence of a TSAb international standard NIBSC 08/204 ("08/204" in the diagram) or serum samples derived from 3 Basedow's disease patients ("Specimens 1 to 3" in the diagram), followed by analysis by GloSensor cAMP Assay. "Luciferase activity level" on the ordinate is shown as a relative value when a luciferase activity level before addition of each sample is defined as 1.

The HEK293 cells as well as the CHO cells were transfected with 2 μg and 0.02 μg of two types of vectors (pGloSenso-22F and pcDNA3.1_hTSHR), respectively, by the method described in the section "1-1 Method" of Example 1. Luciferase activity levels were measured at a point in time of 20 minutes after addition of the measurement samples (see FIG. 7).

6-3 Results

In the case of using CHO cells, elevation of the luciferase activity level dependent on the TSAb international standard NIBSC 08/204 and serum samples derived from 3 Basedow's disease patients was observed. However, in the case of using HEK293 cells, the luciferase activity was 2 to 7 times higher than that in the case of using the CHO cells. These results indicate that when a human embryonic kidney cell-derived cell line such as HEK293 cells is used as mammal cells expressing the cAMP biosensor and the TSH receptor, the detection sensitivity of TSAb is improved as compared with the case of using a cell line other than the human embryonic kidney cell-derived cell line, such as CHO cells.

Example 7. Study on Type of Line of Mammal Cell—2

The type of a line of mammal cells was further studied. Specifically, the following method was performed using the following material.

7-1 Material

The mammal cells used were a human embryonic kidney cell-derived cell line (HEK293 cells) and a human bone tumor cell line (U2OS cells) (obtained from ECACC, Cat no. 92022711). The measurement sample used was rhTSH.

7-2 Method

[1] $4 \times 10^5$ HEK293 cells or U2OS cells were inoculated to each well of a 6-well multiplate and cultured for 24 hours.

Figure 8A:
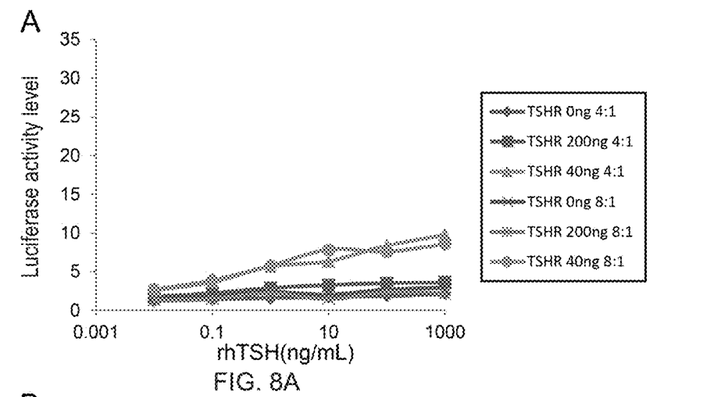
FIG. 8A is a diagram showing results of incubating U2OS cells expressing both a cAMP biosensor and a TSH receptor in the presence of varying concentrations (0.01 ng/mL, 0.1 ng/mL, 1 ng/mL, 10 ng/mL, 100 ng/mL, and 1000 ng/mL) of recombinant human TSH (rhTSH), followed by analysis by GloSensor cAMP Assay.
Figure 8B:
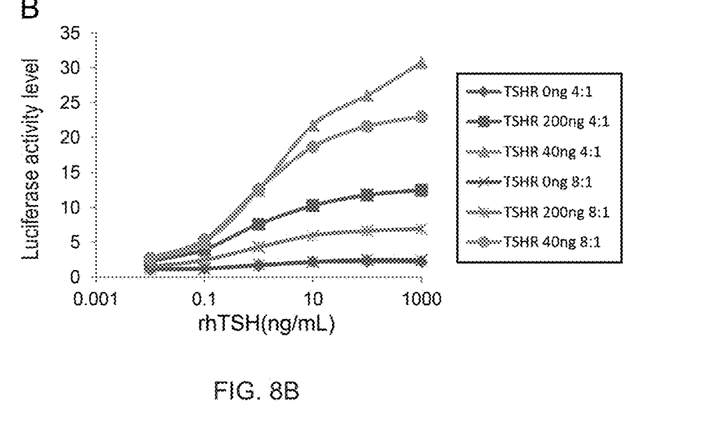
FIG. 8B is a diagram showing results of incubating HEK293 cells expressing both the cAMP biosensor and the TSH receptor in the presence of the same concentrations as in FIG. 8A of rhTSH, followed by analysis by GloSensor cAMP Assay.

[2] The HEK293 cells or the U2OS cells were transfected with a plasmid mixture of pGloSenso-22F (manufactured by Promega Corp.) and pcDNA3.1_hTSHR according to the procedures (1) to (4) given below. 1 µg of pGloSenso-22F and 0 ng, 40 ng or 200 ng of pcDNA3.1_hTSHR ("TSHR 0 ng", "TSHR 40 ng", and "TSHR 200 ng", respectively, in FIG. 8) per well were used in the transfection. Polyethyleneimine (PEI) (manufactured by Polysciences, Inc.) was used in an amount (µL) of 4 times or 8 times ("4:1" and "8:1", respectively, in FIG. 8) the amount of the plasmid (µg).
(1) PEI was added to 50 µL of Opti-MEM, and the mixture was left standing at room temperature for 5 minutes.
(2) The plasmid mixture was added to 50 µL of Opti-MEM. Then, Opti-MEM containing the plasmid mixture was mixed with Opti-MEM containing PEI prepared in the procedure (1), and the mixture was left standing at room temperature for 20 minutes.
(3) 100 µL of Opti-MEM containing the plasmid mixture and PEI prepared in the procedure (2) was added dropwise to the HEK293 cells or the U2OS cells.
[3] The cells cultured for 24 hours were detached from the wells using Accutase (manufactured by Nacalai Tesque, Inc.) and centrifuged. After removal of the supernatant, the cells were suspended by the addition of 250 µL of a reaction buffer solution (HBSS containing 0.01% BSA, 125 mM sucrose, 13.8 mM sodium chloride, and 4% PEG).
[4] 30 µL of the cell suspension was added to each well of a white 96-well plate. Then, 10 µL of 8 mM D-luciferin diluted with the reaction buffer solution was added to each well. The plate was left standing for 2 hours with light shielded. Then, varying concentrations (see FIG. 8) of recombinant human TSH (rhTSH) (manufactured by Sanofi K.K.) were added thereto at 10 µL/well. Luciferase activity levels were measured using a 96-well multiplate luminometer (manufactured by Tecan Japan Co., Ltd.). For a comparative control, a luciferase activity level was also measured before addition of rhTSH. The luciferase activity levels were measured as values after addition of rhTSH and incubation for 20 minutes.

7-3 Results

In the case of using U2OS cells as well, elevation of the luciferase activity level dependent on the expression of the TSH receptor and rhTSH (i.e., a TSH receptor stimulating substance) was observed. However, in the case of using HEK293 cells, the luciferase activity was around 3 to 4 times higher than that in the case of using the U2OS cells. These results, as in the results of Example 6, indicate that when a human embryonic kidney cell-derived cell line such as HEK293 cells is used as mammal cells expressing the cAMP biosensor and the TSH receptor, the detection sensitivity of TSAb is improved as compared with the case of using a cell line other than the human embryonic kidney cell-derived cell line, such as U2OS cells.

INDUSTRIAL APPLICABILITY

The present invention contributes to the diagnosis and treatment of a thyroid disease caused by a TSH receptor stimulating or inhibiting autoantibody.

The invention claimed is:
1. A method for measuring autoantibody activity against a thyroid stimulating hormone (TSH) receptor in a mammal cell, comprising the following steps (a) to (c):
   (a) incubating a mammal cell expressing both a luciferase containing cAMP binding region and the TSH receptor in the presence of a blood sample collected from a test subject and a substrate capable of visualizing or quantifying the luciferase containing cAMP binding region;
   (b) measuring an activation level of the luciferase containing cAMP binding region after the step (a); and
   (c) comparing the activation level measured in the step (b) with an activation level in a control to calculate the autoantibody activity.
2. The method according to claim 1, wherein the autoantibody activity is a stimulatory activity or inhibitory activity.
3. The method according to claim 1, wherein the method is completed within 3 hours.
4. The method according to claim 1, wherein the mammal cell is a human embryonic kidney cell-derived cell line.
5. The method according to claim 1, further comprising, before the step (a), subjecting the mammal cell to equilibration treatment in a solution for incubation, wherein in the step (a), the mammal cell and the blood sample are incubated in the solution for incubation, and the sum of a time required for carrying out the steps (a) and (b) and an equilibration treatment time is 2 hours or less.
6. The method according to claim 1, wherein the mammal cell is a GNAS gene- and GNAL gene-knockout mammal cell expressing exogenous Gαs protein.
7. The method according to claim 2, wherein the method is completed within 3 hours.
8. The method according to claim 2, wherein the mammal cell is a human embryonic kidney cell-derived cell line.
9. The method according to claim 3, wherein the mammal cell is a human embryonic kidney cell-derived cell line.
10. The method according to claim 7, wherein the mammal cell is a human embryonic kidney cell-derived cell line.
11. The method according to claim 2, further comprising, before the step (a), subjecting the mammal cell to equilibration treatment in a solution for incubation, wherein in the step (a), the mammal cell and the blood sample are incubated in the solution for incubation, and the sum of a time required for carrying out the steps (a) and (b) and an equilibration treatment time is 2 hours or less.
12. The method according to claim 3, further comprising, before the step (a), subjecting the mammal cell to equilibration treatment in a solution for incubation, wherein in the step (a), the mammal cell and the blood sample are incubated in the solution for incubation, and the sum of a time required for carrying out the steps (a) and (b) and an equilibration treatment time is 2 hours or less.
13. The method according to claim 4, further comprising, before the step (a), subjecting the mammal cell to equilibration treatment in a solution for incubation, wherein in the step (a), the mammal cell and the blood sample are incubated in the solution for incubation, and the sum of a time required for carrying out the steps (a) and (b) and an equilibration treatment time is 2 hours or less.
14. The method according to claim 7, further comprising, before the step (a), subjecting the mammal cell to equilibration treatment in a solution for incubation, wherein in the step (a), the mammal cell and the blood sample are incubated in the solution for incubation, and the sum of a time required for carrying out the steps (a) and (b) and an equilibration treatment time is 2 hours or less.
15. The method according to claim 8, further comprising, before the step (a), subjecting the mammal cell to equilibration treatment in a solution for incubation, wherein in the step (a), the mammal cell and the blood sample are incubated in the solution for incubation, and the sum of a time required for carrying out the steps (a) and (b) and an equilibration treatment time is 2 hours or less.

16. The method according to claim 9, further comprising, before the step (a), subjecting the mammal cell to equilibration treatment in a solution for incubation, wherein in the step (a), the mammal cell and the blood sample are incubated in the solution for incubation, and the sum of a time required for carrying out the steps (a) and (b) and an equilibration treatment time is 2 hours or less.

\* \* \* \* \*